US008826376B2

(12) United States Patent
Cakulev et al.

(10) Patent No.: US 8,826,376 B2
(45) Date of Patent: Sep. 2, 2014

(54) COMMUNICATION OF SESSION-SPECIFIC INFORMATION TO USER EQUIPMENT FROM AN ACCESS NETWORK

(75) Inventors: Violeta Cakulev, Millburn, NJ (US); Semyon B. Mizikovsky, Morganville, NJ (US); Christopher Francis Mooney, Livingston, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1205 days.

(21) Appl. No.: 12/401,287

(22) Filed: Mar. 10, 2009

(65) Prior Publication Data
US 2010/0235890 A1  Sep. 16, 2010

(51) Int. Cl.
*G06F 21/00* (2013.01)
*H04L 29/06* (2006.01)

(52) U.S. Cl.
USPC ............... 726/3; 726/5; 726/27; 380/247

(58) Field of Classification Search
None
See application file for complete search history.

(56) References Cited

U.S. PATENT DOCUMENTS

| 2006/0174004 A1* | 8/2006 | Asthana ............... 709/225 |
| 2008/0089293 A1* | 4/2008 | Madour et al. ......... 370/331 |
| 2008/0195861 A1* | 8/2008 | Salomone ............ 713/155 |
| 2008/0259876 A1* | 10/2008 | Qiang et al. .......... 370/332 |
| 2008/0263631 A1* | 10/2008 | Wang et al. ............ 726/2 |
| 2008/0267407 A1* | 10/2008 | Vanderveen ........... 380/277 |
| 2008/0318575 A1* | 12/2008 | Ulupinar et al. ........ 455/436 |
| 2009/0073933 A1* | 3/2009 | Madour et al. ......... 370/331 |
| 2009/0217033 A1* | 8/2009 | Costa et al. ........... 713/155 |

FOREIGN PATENT DOCUMENTS

| EP | 1662726 | 5/2006 |
| EP | 2018083 | 1/2009 |
| WO | PCT/US2010/024885 | 6/2010 |

OTHER PUBLICATIONS

3GPP2, "cdma2000 High Rate Packet Data Supplemental Services," Version 1.0, Apr. 2006, p. 2-55.*
Ali, et al. "Network-Based Mobility Management in the Evolved 3GPP Core Network," Feb. 2009, IEEE Communications Magazine, pp. 58-65.*
Wang, et al. "A Novel Network Architecture for 3G Evolution," 2006, IEEE, The 17th Annual IEEE Symposium on PIMRC.*
Morgan, J. "From CDMA, to LTE via eHRPD," Nov. 2008, Wireless Asia, pp. 20-21.*
C. He, et al. "Analysis of the 802.11i 4-Way Handshake," WiSE'04, ACM, Oct 2004.*
IEEE Standards, "IEEE 802.11i Standard" IEEE Computer Society, Jul. 23, 2004.*
"cdma2000 High Rate Packet Data Air Interface Specification," 3GPP2 C.S0024-A, Version 2.0, Jul. 2005, pp. 4-41-4-48.*

(Continued)

*Primary Examiner* — Jung Kim
*Assistant Examiner* — Robert Leung
(74) *Attorney, Agent, or Firm* — Ryan, Mason & Lewis, LLP

(57) ABSTRACT

In conjunction with establishment of a session between an access network and user equipment of a communication system, session-specific information is transmitted from the access network to the user equipment. The session-specific information transmitted from the access network to the user equipment comprises information to be utilized in an authentication protocol carried out between the user equipment and an authentication server of the system. For example, the session-specific information transmitted from the access network to the user equipment may comprise an identifier of a gateway coupled between the access network and the authentication server.

21 Claims, 5 Drawing Sheets

(56) References Cited

OTHER PUBLICATIONS

B. Aboba et al., IETF RFC 3748, "Extensible Authentication Protocol (EAP)," Jun. 2004, 67 pages.

J. Arkko et al., IETF RFC 4187, "Extensible Authentication Protocol Method for 3rd Generation Authentication and Key Agreement (EAP-AKA)," Jan. 2006, 79 pages.

J. Arkko et al., IETF Internet-Draft draft-arkko-eap-aka-kdf-10, "Improved Extensible Authentication Protocol Method for 3rd Generation Authentication and Key Agreement (EAP-AKA')," Nov. 18, 2008, 23 pages.

3GPP2 Specification No. A.S0008-0 v4.0, "Interoperability Specification (IOS) for High Rate Packet Data (HRPD) Radio Access Network Interfaces with Session Control in the Access Network," May 2007, 136 pages.

3GPP2 Specification No. X.S0057-0, "E-UTRAN—HRPD Connectivity and Interworking: Core Network Aspects," 152 pages.

3GPP TR 33.402, V8.3.1, 3rd Generation Partnership Project; Technical Specification Group Services and System Aspects; 3GPP System Architecture Evolution (SAE), Security aspects of non-3GPP accesses, Release 8, Mar. 2009, 42 pages.

3GPP TSG SA WG3-S3#52, "Analysis of AKA Changes in EPS," Sophia Antipolis, S3-080776, Qualcomm Europe, Discussion/Decision, 6.9, Jun. 23-27, 2008, 4 pages.

3GPP2 TSG-X WG5, "X.P0057-0—Section 5.6 Authentication," X50-20080218, Feb. 18, 2008, 7 pgs.

3GPP2 TSG-S WG4 / TSG-X WG5 (PDS), "Issues with the Proposed New EAP-AKA Requirements for eHRPD," Qualcomm Incorporated, Jun. 2008, 9 pages.

\* cited by examiner

COMMUNICATION OF SESSION-SPECIFIC INFORMATION TO USER EQUIPMENT FROM AN ACCESS NETWORK

FIELD OF THE INVENTION

The present invention relates generally to communication systems, and more particularly to communication protocols for use within such systems.

BACKGROUND OF THE INVENTION

Wireless communication standards continue to evolve. For example, in the cellular context, standards are currently evolving from third generation (3G) standards to fourth generation (4G) standards. The 3G standards include GSM and UMTS standards promulgated by an organization known as the 3G Partnership Project (3GPP) and CDMA2000 standards such as High Rate Packet Data (HRPD) promulgated by an organization referred to as 3GPP2. The 4G standards currently under development by 3GPP are generally referred to as Long Term Evolution (LTE) standards. The 3GPP and 3GPP2 specification documents, including, for example, 3GPP2 Specification No. A.S0008-0 v4.0, "Interoperability Specification (IOS) for High Rate Packet Data (HRPD) Radio Access Network Interfaces with Session Control in the Access Network," May 2007, are freely available online and are incorporated by reference herein in their entirety.

LTE networks will make use of an Internet protocol (IP) based packet core referred to as Evolved Packet Core (EPC). In order to facilitate the transition to LTE networks, 3GPP2 has developed what is referred to as enhanced HRPD (eHRPD), which allows HRPD access networks to utilize the LTE EPC. Such HRPD access networks are also referred to herein as eHRPD access networks.

The eHRPD approach utilizes an HRPD Serving Gateway (HSGW) to interface eHRPD access networks to the LTE EPC. The HSGW provides interworking between the eHRPD access networks and a Packet Data Network (PDN) of the EPC. For example, the HSGW may interface with a PDN gateway (PGW) of the EPC. The HSGW may be implemented as a separate network element, or alternatively may be viewed as comprising or being incorporated into a Packet Data Serving Node (PDSN) in the access network.

The 3GPP LTE standards generally require the use of a specially-formatted authentication protocol when allowing access to the EPC from a non-3GPP system such as an eHRPD access network. This authentication protocol is carried out between a mobile station or other user equipment associated with the non-3GPP system element and an authentication server of the EPC using an authenticator that in the eHRPD context typically comprises the HSGW. The authentication protocol generally involves key derivation in which keying material is bound to appropriate context information such as Mobile Station Identity (MSID) and authenticator identity.

In conventional practice, the authenticator identity may be given, for example, by a carrier identifier, such as a combination of Mobile Country Code (MCC) and Mobile Network Code (MNC). Other types of information may be used to represent the authenticator identity to both the user equipment and the authentication server. Such information may simply identify the particular technology used by the authenticator, e.g., HRPD.

SUMMARY OF THE INVENTION

We have recognized that the above-described conventional approach to authentication between an eHRPD access network and an LTE EPC is deficient in that the use of carrier identifier, authenticator technology identifier or other similar types of information in the authentication protocol may result in the same identity being used for multiple authenticators, thereby exposing the system to what we refer to herein as a "lying authenticator" attack. In this attack, an authenticator provides different identities to the mobile station and the authentication server, which can seriously undermine the legitimacy of the authentication protocol and lead to security problems in the system.

Illustrative embodiments of the invention provide techniques for transmitting authenticator identity information from an access network to user equipment within an existing standard messaging structure. The techniques can be implemented in a simple and efficient manner within the framework of existing messaging protocols, and thus without the need for substantial changes to the standards.

In accordance with one aspect of the invention, session-specific information is transmitted from the access network to the user equipment. The session-specific information transmitted from the access network to the user equipment comprises information to be utilized in an authentication protocol carried out between the user equipment and an authentication server of the system. For example, the session-specific information transmitted from the access network to the user equipment may comprise an identifier of a gateway coupled between the access network and the authentication server. The user equipment utilizes the gateway identifier in deriving at least one key as part of the authentication protocol, in order to prevent the lying authenticator attack.

In one of the illustrative embodiments, the access network comprises an eHRPD access network and the gateway comprises an HSGW configured to provide an interface between the eHRPD access network and an EPC of an LTE network. The session-specific information transmitted from the eHRPD access network to the user equipment in this embodiment comprises an identifier of the HSGW, such as an IP address of the HSGW. Furthermore, the authentication protocol in this embodiment comprises an EAP authentication protocol in which the user equipment operates as an EAP peer, the HSGW operates as an EAP authenticator and the authentication server operates as an EAP authentication server.

The session-specific information may be transmitted using a distinct message type of an existing eHRPD message format, such as a StorageBLOB Assignment message having a particular defined StorageBLOB type.

Advantageously, the illustrative embodiments can provide significantly improved security in communication systems in which an eHRPD access network communicates with an LTE EPC, without unduly increasing system cost or complexity. The disclosed techniques are also applicable to the communication of other types of session-specific information between an access network and user equipment in such systems.

These and other features and advantages of the present invention will become more apparent from the accompanying drawings and the following detailed description.

DETAILED DESCRIPTION OF THE INVENTION

The present invention will be illustrated herein in conjunction with exemplary communication systems and associated techniques for communicating authenticator identity or other session-specific information between an access network and user equipment in a communication system. It should be understood, however, that the invention is not limited to use with the particular types of communication systems and session-specific information communication processes disclosed. The invention can be implemented in a wide variety of other communication systems, using alternative processing steps. For example, although illustrated in the context of wireless cellular systems in which non-3 GPP system elements such as an eHRPD access network communicate with 3GPP system elements such as an LTE EPC, the disclosed techniques can be adapted in a straightforward manner to a variety of other types of communication systems, including WiMAX systems, Wi-Fi systems, etc.

Figure 1:
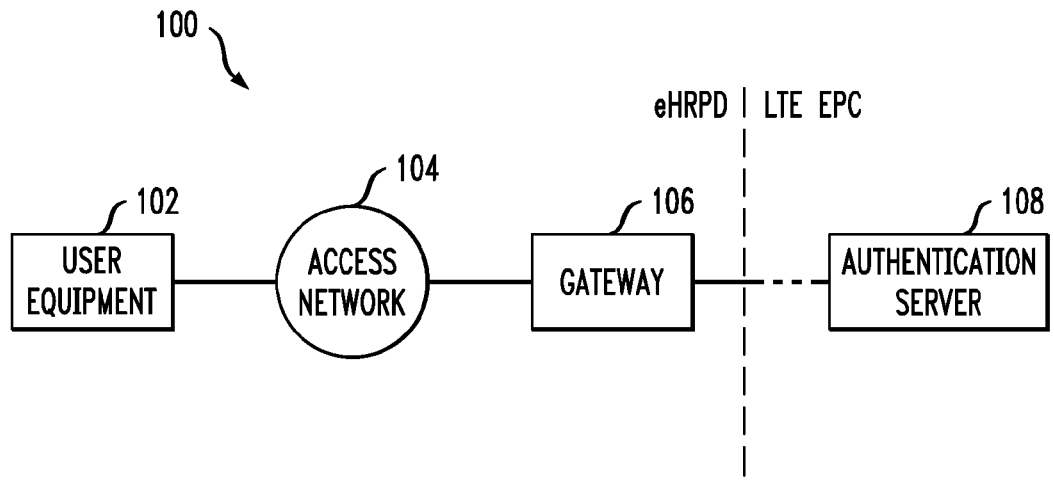
FIG. 1 is a block diagram of a communication system in an illustrative embodiment of the invention.

FIG. 1 shows a communication system 100 comprising user equipment (UE) 102 that communicates via access network 104 and gateway 106 with an authentication server 108. The user equipment 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices. The access network 104 may comprise a plurality of base stations and one or more associated radio network controllers (RNCs).

In the present illustrative embodiment, the communication system 100 comprises a wireless cellular system. The access network 104 and gateway 106 comprise respective eHRPD access network and HSGW elements of an eHRPD network and the authenticator server 108 comprises an element of an LTE EPC. Thus, in this embodiment a non-3GPP portion of the system 100 comprising elements 104 and 106 interfaces with a 3GPP portion of the system comprising authentication server 108 and other 3GPP system elements. The authentication server 108 may comprise, for example, a 3GPP Authentication, Authorization and Accounting (AAA) server.

The FIG. 1 arrangement is just one exemplary configuration of a wireless cellular system, and numerous alternative configurations of system elements may be used. For example, although only single user equipment, access network, gateway and server elements are shown in the FIG. 1 embodiment, this is for simplicity and clarity of description only. A given alternative embodiment of the invention may of course include larger numbers of such system elements, as well as additional or alternative elements of a type commonly associated with conventional system implementations.

As will be described in greater detail below, the present embodiment of the system 100 is configured such that the access network 104 transmits an identifier of the gateway 106 to the user equipment 102 in conjunction with establishment of a communication session between the access network and the user equipment. The gateway serves as an authenticator in an authentication protocol carried out between the user equipment and the authentication server 108 of the system. The authenticator identity is an example of what is more generally referred to herein as "session-specific information" that is transmitted between an access network and user equipment in conjunction with the establishment of a communication session between these system elements. The authenticator identity or other session-specific information can be transmitted in a particularly efficient manner using a distinct message type of an existing eHRPD message format, such as, for example, a StorageBLOB Assignment message having a particular defined StorageBLOB type.

In illustrative embodiments, the authenticator identity can be transmitted in the form of a single authenticator identifier. Other embodiments may, for example, utilize multiple identifiers or other sets of information to convey authenticator identity.

The transmission of authenticator identity from the access network 104 to the user equipment 102 overcomes security problems associated with the above-described conventional approach of using carrier identifier or authenticator technology identifier as part of the context information to which keying material is bound in an authentication protocol carried out between user equipment 102 and authentication server 108. As mentioned previously, we have determined that the conventional use of carrier identifier or authenticator technology identifier can facilitate what we refer to as a "lying authenticator" attack, in which possible use of the same identity for multiple authenticators allows the gateway 106 to provide one authenticator identity to the user equipment 102 and a different authenticator identity to the authentication server 108. This provision of different identities to the user equipment and authentication server allows the gateway to undermine the authentication protocol and to introduce security weaknesses that can be further exploited. In the illustrative embodiments, this ability to prevent a lying authenticator attack can be achieved in a simple and efficient manner within the framework of the existing eHRPD messaging protocols, and thus without the need for substantial changes to the 3GPP or 3GPP2 standards.

Figure 2:
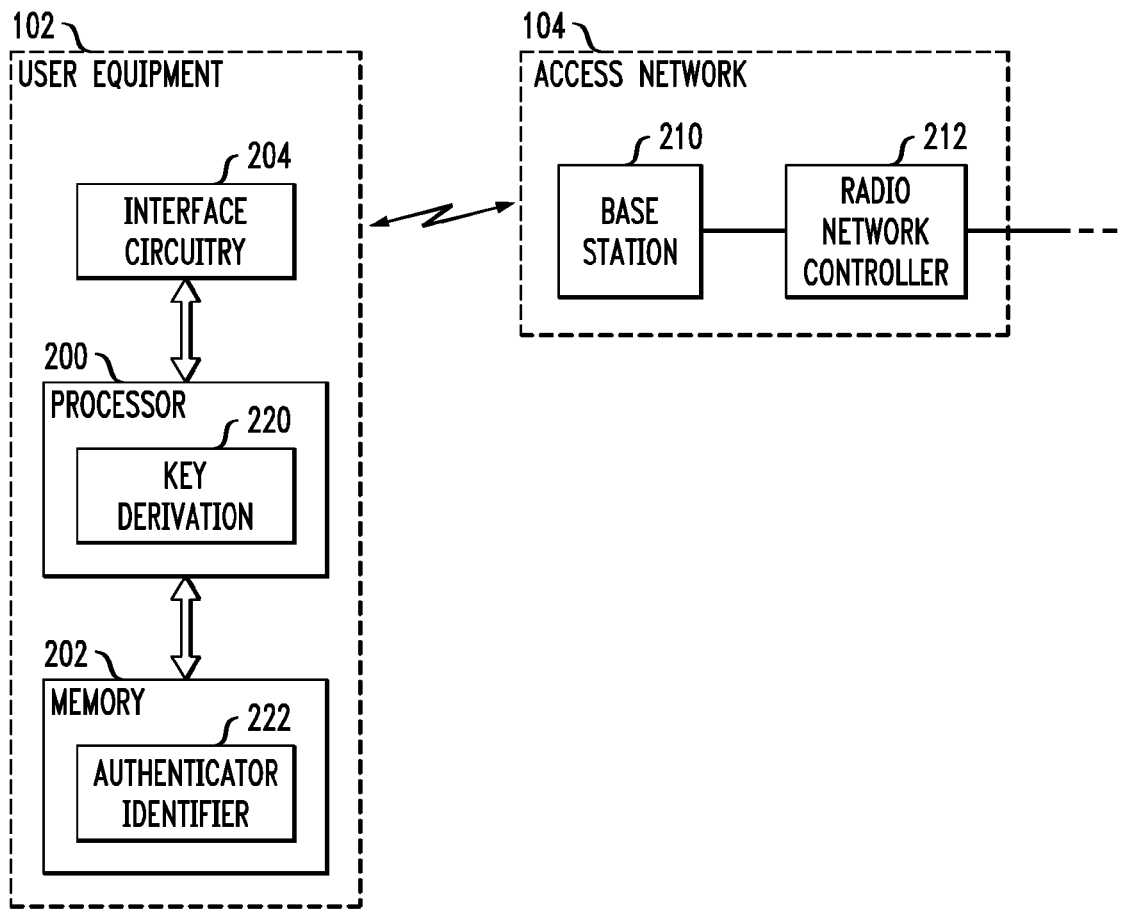
FIG. 2 shows a more detailed view of user equipment and access network elements in one possible implementation of the FIG. 1 system.

FIG. 2 shows a more detailed view of the user equipment 102 and access network 104 in the illustrative embodiment. The user equipment comprises a processor 200 coupled to a memory 202 and interface circuitry 204. The access network comprises a base station 210 and an RNC 212 coupled to the base station. Elements 210 and 212 of the access network 104 may each comprise processor, memory and interface circuitry elements, although such elements are not explicitly shown in the figure. Also, as indicated previously, the access network may comprise multiple base stations and RNCs.

The memory elements of the user equipment 102 and access network 104 may be used to store one or more software programs that are executed by the respective processors to implement the functionality described herein. For example, message generation and other functionality as described in conjunction with FIGS. 5 and 6 may be implemented in a straightforward manner using software code executed by processors of the user equipment and access network. The memory elements such as memory 202 are examples of what are more generally referred to herein as computer-readable storage media that store executable program code. Such computer-readable storage media may comprise, for example, electronic memory such as random access memory (RAM) or read-only memory (ROM), magnetic memory, optical memory or other types of storage elements, as well as portions or combinations of such elements. The processor elements such as processor 200 may comprise, for example, microprocessors, application-specific integrated circuits (ASICs), digital signal processors (DSPs) or other types of processing devices, as well as portions or combinations of such elements. The interface circuitry elements such as interface circuitry 204 may comprise transceivers or other communication hardware or firmware that allows the associated system elements to communicate with one another in the manner described herein.

The processor 200 of the user equipment 102 includes a key derivation element 220 that may be implemented in the form of software executed by the processor. The key derivation element derives at least one key based on authenticator identity and other information, as part of the authentication protocol carried out between the user equipment and the authentication server 108. For example, a given such key may be bound to the authenticator identity as well as other context information such as MSID. The authenticator identifier communicated from the access network 104 to the user equipment 102 for use by the key derivation element 220 is stored in an associated storage location 222 in the memory 202. Other types of session-specific information received in the user equipment from the access network may be processed and stored in a similar manner.

It is apparent from the FIG. 2 arrangement that user equipment 102 is configured for connection with access network 104 and vice-versa. Terms such as "connection," "connection between" and "coupled to" as used herein are intended to be construed generally, and accordingly should not be construed as requiring direct connection between the associated elements. Thus, user equipment 102 may be connected with access network 104 in a given embodiment via one or more other system elements. The same applies for connections between access network 104 and gateway 106, between gateway 106 and authentication server 108, and between other system elements. Also, elements such as gateway 106 and server 108 need not be implemented on separate stand-alone processing platforms, but could instead, for example, represent different functional portions of a single common processing platform.

Figure 3:
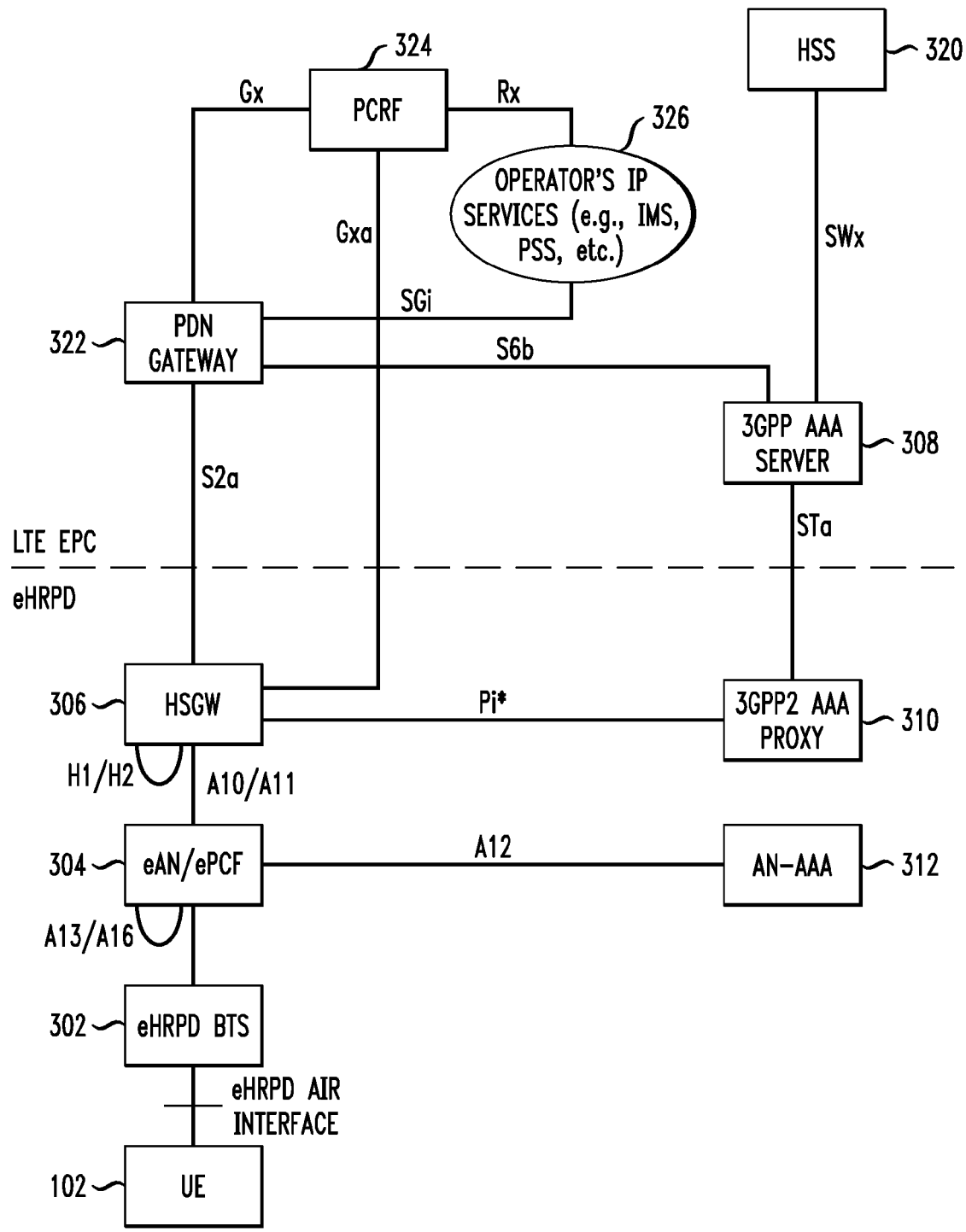
FIG. 3 shows another example of a communication system in an illustrative embodiment of the invention.

FIG. 3 shows another example of a communication system 300 in accordance with an illustrative embodiment of the invention. This exemplary system, like system 100 of FIG. 1, includes an eHRPD portion and an LTE EPC portion, with these portions being separated from one another by a dashed line.

In system 300, user equipment 102 communicates via an eHRPD air interface with an eHRPD base transceiver system (BTS) 302 coupled to an enhanced access network/enhanced packet control function (eAN/ePCF) 304. Elements 302 and 304 may be viewed as one example of the access network 104 in system 100 of FIG. 1. The eAN/ePCF element 304 is interfaced to the LTE EPC via an HSGW 306, which may be viewed as one example of the gateway 106 in system 100. The HSGW 306 communicates with a 3GPP AAA server 308 via a 3GPP2 AAA proxy 310 as shown. The 3GPP AAA server 308 may be viewed as one example of the authentication server 108 in system 100. The eAN/ePCF element 304 communicates with an access network AAA (AN-AAA) server 312.

The 3GPP portion of system 300 of FIG. 3 further comprises a Home Subscriber Server (HSS) 320 and a PDN gateway 322. The PDN gateway is coupled between the non-3GPP HSGW 306 and a number of 3GPP system elements including the 3GPP AAA server 308, a Policy and Charging Rules Function (PCRF) 324, and an Operator IP services element 326. The latter element may comprise, for example, IP Multimedia Subsystem (IMS), Packet-Switched Streaming (PSS), etc.

Conventional aspects of the operation of the various system elements and associated interfaces shown in FIG. 3, including the eHRPD air interface as well as the A10, A11, A12, A13, A16, H1, H2, Pi*, S2a, STa, S6b, SGi, Gx, Gxa and Rx interfaces, are described in detail in the above-cited 3GPP and 3GPP2 specification documents.

It should be noted that, although identities of the BTS 302 and eAN 304 are generally available and known within the system 100, such identities comprising the eHRPD base station ID and access network subnet ID, respectively, these identities do not represent the particular HSGW 306 which assumes the functionalities of the authenticator. There could be multiple subnets that are served by the same HSGW, and even though both the user equipment 102 and the HSGW know which base station and subnet handle current communications, the base station and subnet may change many times during the session, while the authenticator will still remain as the same HSGW. Conventional systems fail to provide any defined signaling protocol or other means to allow the user equipment 102 to learn the identity of the particular HSGW 306 that is serving as the authenticator.

Figure 4:
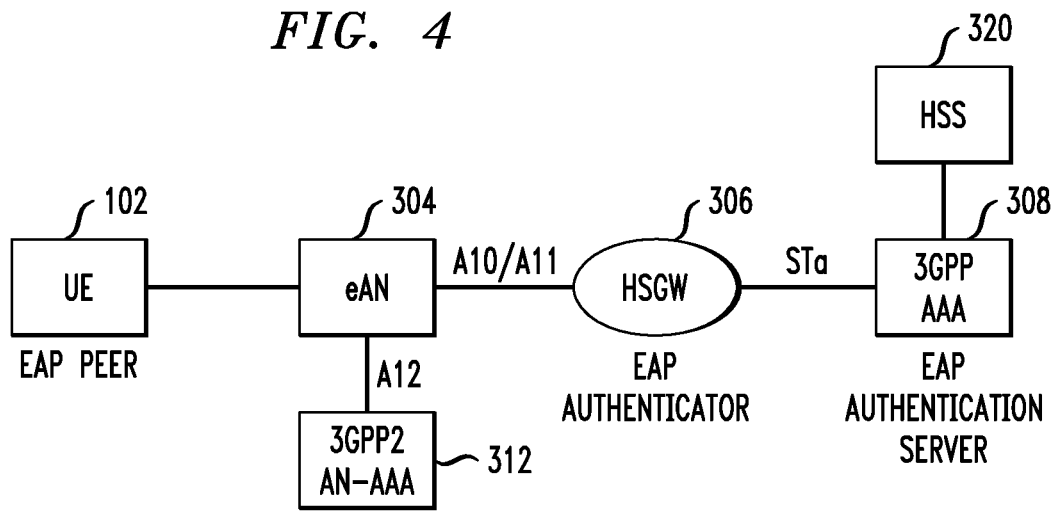
FIG. 4 is a simplified version of the FIG. 3 system diagram illustrating system elements associated with an authentication protocol carried out between user equipment and an authentication server of the system.

FIG. 4 shows certain elements of the system 300 that are associated with performance of an authentication protocol. The authentication protocol in this embodiment comprises an Extensible Authentication Protocol (EAP) in which user equipment 102 operates as an EAP peer, HSGW 306 operates as an EAP authenticator and 3GPP AAA server 308 operates as an EAP authentication server.

The authentication protocol allows the user equipment 102 and 3GPP AAA server 308 to authenticate one another via the HSGW 306 operating as the EAP authenticator. Conventional aspects of EAP authentication can be found in IETF RFC 3748, "Extensible Authentication Protocol (EAP)," B. Aboba, L. Blunk, J. Vollbrecht, J. Carlson and H. Levkowetz, June 2004, which is incorporated by reference herein. There are a number of different variants of EAP authentication. These include, for example, EAP-AKA authentication, where AKA denotes Authentication and Key Agreement. This variant is assumed to be utilized in the present embodiment, and is described in IETF RFC 4187, "Extensible Authentication Protocol Method for 3rd Generation Authentication and Key Agreement (EAP-AKA)," J. Arkko and H. Haverinen, January 2006, which is incorporated by reference herein. Another EAP variant is EAP-AKA' authentication, described in IETF Internet-Draft draft-arkko-eap-aka-kdf-10, "Improved Extensible Authentication Protocol Method for 3rd Generation Authentication and Key Agreement (EAP-AKA')," J. Arkko, V. Lehtovirta and P. Eronen, Nov. 18, 2008, which is incorporated by reference herein. These and other variants are examples of EAP authentication protocols that may be utilized in a given embodiment of the invention. Other embodiments may be implemented that utilize other types of authentication protocols, including non-EAP authentication protocols.

Once the user equipment and 3GPP AAA server have authenticated one another, and a determination has been made that the user equipment is authorized to access the LTE EPC portion of the system, the 3GPP AAA server sends a Master Session Key (MSK) to the HSGW 306 which as noted above acts as the EAP authenticator. The MSK is potentially based on an identifier of the HSGW.

As described previously herein, conventional practice suffers from a significant deficiency in that the user equipment may utilize, for example, a carrier identifier or an authenticator technology identifier as part of the context information in its key derivation, making the system vulnerable to the previously-described lying authenticator attack.

The present illustrative embodiment overcomes this problem by configuring the access network 304 to provide the identity of the HSGW 306 to the user equipment such that it is available to the user equipment when the EAP access authentication is performed. This ensures that the HSGW will be uniquely identified and this unique identity can be incorporated into the authentication protocol. For example, the user equipment can utilize the HSGW identity as context information that is incorporated into the derivation of one or more keys in key derivation element 220. This binds the HSGW identity to the access authentication results, thereby preventing the lying authenticator attack.

The HSGW identity communicated from the access network 304 to the user equipment 102 may comprise an identifier of the HSGW 306. This identifier may be in the form of an IP address or other information that can be used to identify the HSGW in a manner that ensures that the same identifier will not be used for multiple HSGWs.

As noted above, the HSGW identifier may be transmitted using a distinct message type of an existing eHRPD message format.

Figure 5:
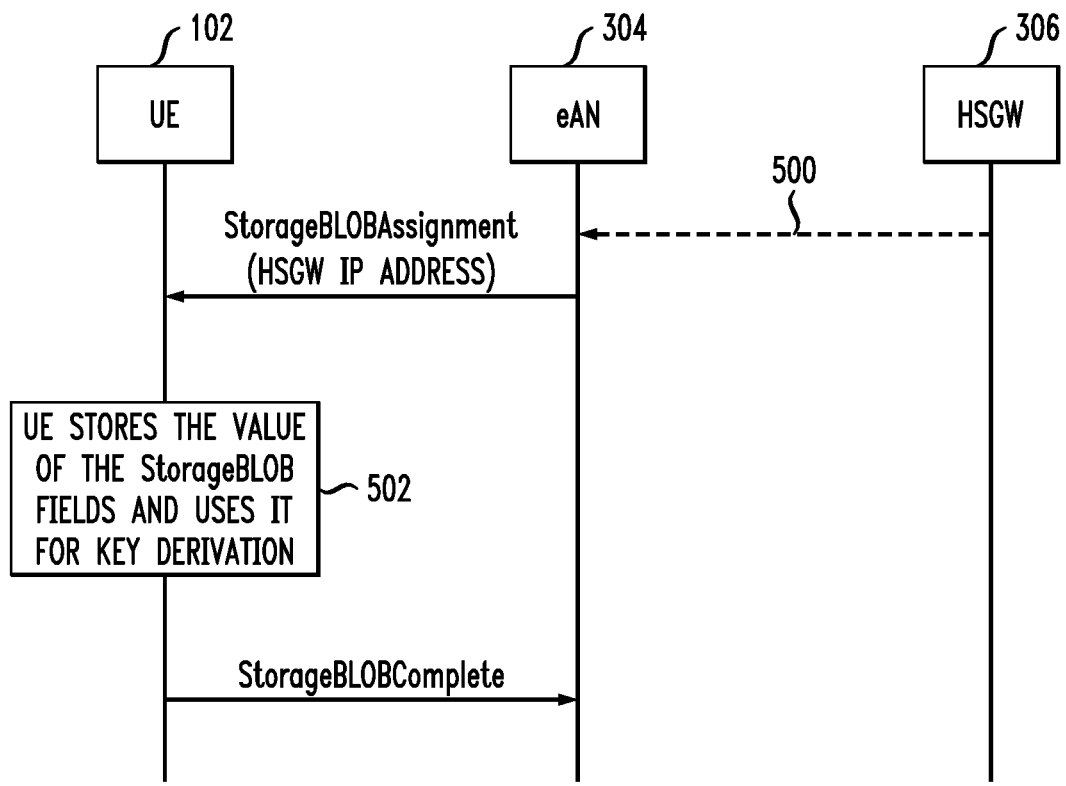
FIG. 5 illustrates the communication of authenticator identity between the access network and the user equipment in the FIG. 3 system.

Referring now to FIG. 5, an example of a messaging arrangement that may be used for HSGW identifier transmission is shown. At some time prior to the transmission of the HSGW identifier, the identifier of the HSGW 306 is provided to the access network 304 as indicated by the dashed arrow 500. Then, prior to conducting the EAP-AKA access authentication, the HSGW identifier is transmitted from the access network to the user equipment 102 in a StorageBLOB Assignment message having a particular defined StorageBLOB type. The HSGW identifier in this embodiment is in the form of the HSGW IP address.

More specifically, for an initial session setup, the access network 304 sends the StorageBLOB Assignment message containing the HSGW IP address before the access network sends an A11 Registration Request message to the HSGW for establishing a main A10 connection. If an A11 Registration Reply is returned indicating that the main A10 connection establishment failed and a new HSGW is selected, the access network sends another StorageBLOB Assignment message with the new HSGW IP address before the access network sends an A11 Registration Request message to the new HSGW. For the case of inter-HSGW handoff, a StorageBLOB Assignment message with a revised HSGW IP address may be sent from the access network to the user equipment.

Conventional StorageBLOB Assignment messaging is used to allow the access network to update information stored in the user equipment. It has not heretofore been applied to communicate HSGW identity to the user equipment for use in access authentication associated with session establishment in order to defeat a lying authenticator attack.

As indicated in block 502, the user equipment 102 stores the value of the StorageBLOB field comprising the HSGW IP address and utilizes the stored value in key derivation. The value is stored in storage element 222 of memory 202, and the associated key derivation is performed using the stored value in key derivation element 220 of processor 200.

The user equipment 102, upon receipt of the HSGW identifier from the access network 304, may send a StorageBLOB Complete message back to the access network to acknowledge the successful receipt of the HSGW IP address.

The access network 304 can utilize any of a number of different techniques to obtain the HSGW IP address that it transmits to the user equipment 102. For example, if the session originated at some other eAN, also referred to as a source eAN, the access network 304 is a target eAN and will receive the HSGW IP address as a part of session context information from the source eAN. As another example, if an HSGW selection algorithm is supported, the eAN can use that algorithm to obtain the HSGW IP address. The HSGW selection algorithm assumes the eAN maintains a configuration table with IP addresses of multiple HSGWs, and then selects a particular HSGW based on, for example, International Mobile Subscriber Identity (IMSI). If the HSGW selection algorithm is not supported, the eAN may use various internal algorithms to select the HSGW (e.g., the HSGW IP address may be pre-provisioned).

The key derivation performed by the user equipment 102 may involve utilizing the HSGW IP address or other HSGW identity as an input in a key derivation function (KDF) to generate an authentication vector (e.g., (CK', IK')=KDF(CK, IK, <HSGW identity>). The authentication vector may in turn be used to derive session keys (e.g., MK, MSK). Other system elements such as HSS 320 can also use the HSGW identity as an input in key derivation function to generate the authentication vector.

It should be noted that the StorageBLOB messaging illustrated in FIG. 5 may be utilized to transfer other types of session-specific information from the access network 304 to the user equipment 102 in conjunction with establishment of a session and performance of associated access authentication. Thus, it is to be understood that alternative embodiments of the invention need not transmit an HSGW identifier as in the FIG. 5 embodiment.

An advantage of the FIG. 5 embodiment is that it uses existing messaging structure to exchange the authenticator identity between the peer (i.e., user equipment 102) and the access network 304 at the time the main service connection is established between the peer and the access network. Also, as mentioned previously, the authenticator identity received by the peer and the authentication server 308 will be the same, and there will be no key mismatch due to the authenticator identity and thus no opportunity for a lying authenticator attack.

The FIG. 5 messaging can be implemented using a new StorageBLOB type that includes authenticator identity (e.g., HSGW IP address). In this way, the new type will not conflict with the existing uses of StorageBLOB messaging. This new StorageBLOB type may be specified as having the field lengths shown below:

| Field | Length |
| --- | --- |
| ParameterType | 8 |
| Length | 8 |
| StorageBLOBType | 16 |
| StorageBLOBLength | 8 |
| StorageBLOB | 8 × StorageBLOBLength |

The various fields of the foregoing table may be defined as follows:
ParameterType=0×04
Length=xxx
StorageBLOBType=XXXX
StorageBLOBLength
StorageBLOB=HSGW IP address It is to be appreciated, however, that other message types and formats may be used to communicate authenticator identity or other session-specific information using the techniques disclosed herein.

Figure 6:
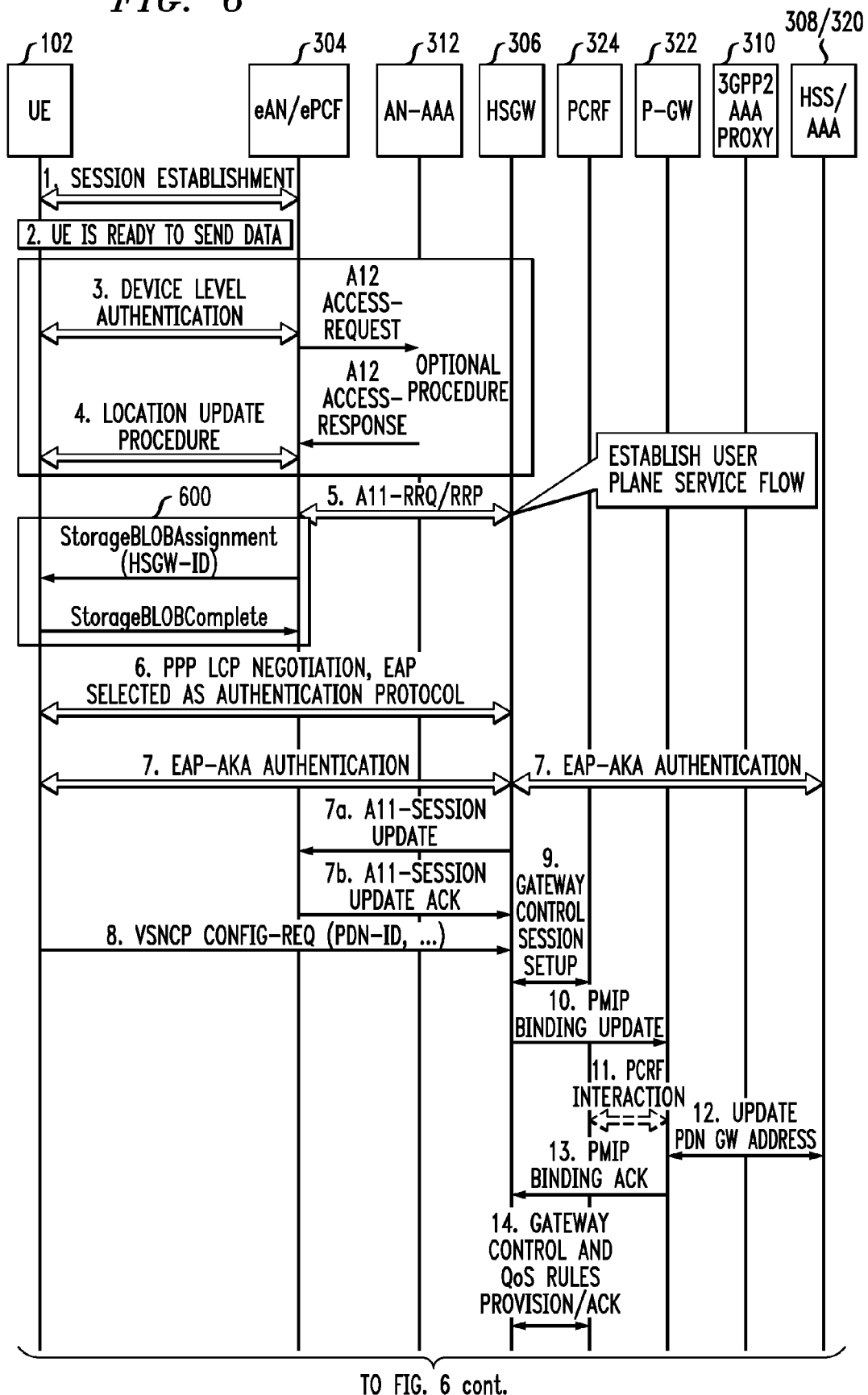
FIG. 6 is a diagram illustrating the manner in which the communication of authenticator identity as shown in FIG. 5 can be integrated into an otherwise conventional messaging protocol within the FIG. 3 system.
Figure 6:
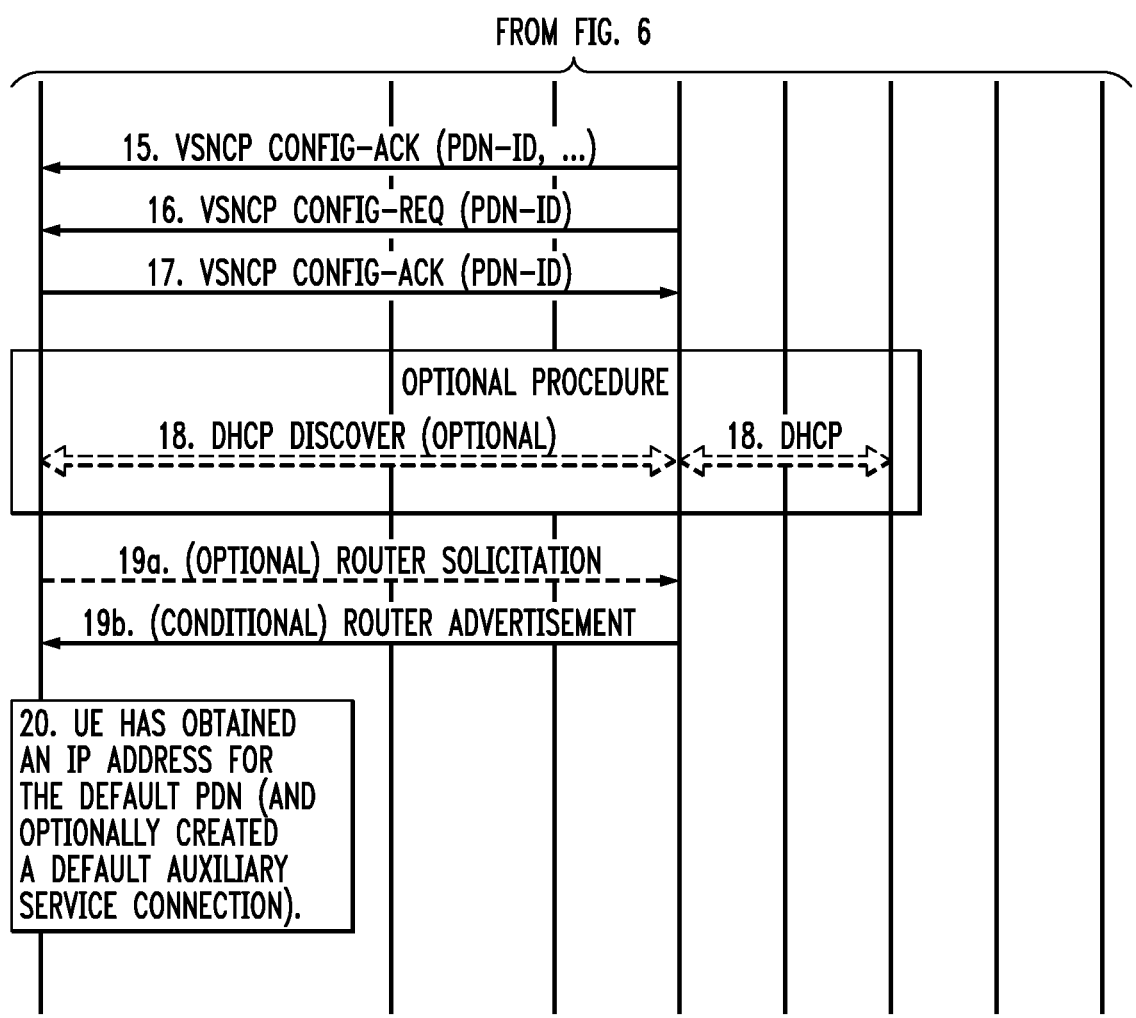

Additional details regarding the A10, A11 and A12 messaging referred to above, as well as other aspects of an eHRPD-LTE interworking messaging protocol that may be utilized in system 300, are shown in FIG. 6. The diagram in this figure illustrates the message flows associated with establishment of a session between user equipment 102 and access network 304. The flows involve system elements 102, 304, 306, 308, 310, 312, 320, 322 and 324, all previously described in conjunction with FIG. 3. System elements 308 and 320 are represented as a single element for purposes of this messaging diagram.

The communication of authenticator identity in the form of HSGW IP address is shown in block 600. This block corresponds to the messages shown in FIG. 5, and provides the user equipment 102 with the identity of HSGW 306 so as to facilitate prevention of a lying authenticator attack in the manner previously described.

The illustrative messaging flow of FIG. 6 generally shows the establishment of a Proxy Mobile IPv6 (PMIP) based S2a connection when the user equipment 102 attaches to the eHRPD network for the first time. The flow includes eHRPD session establishment, optional device level authentication, optional location update procedure, Point-to-Point Protocol (PPP) Link Control Protocol (LCP) negotiation, EAP-AKA authentication, as well as other processes, including Vendor Specific Network Control Protocol (VSNCP) and Dynamic Host Configuration Protocol (DHCP) processes, some of which are indicated as optional or conditional. It should be noted that the designation of only particular elements of the illustrative messaging protocol diagram in FIG. 6 as optional should not be construed as indicating that other elements shown are requirements of the invention. Alternative embodiments of the invention may be configured which do not utilize any of the elements shown.

Steps (1) through (20) of FIG. 6 are configured substantially as described in the above-cited 3GPP and 3GPP2 specification documents, including, by way of example, 3GPP2 Specification No. X.S0057-0, "E-UTRAN—HRPD Connectivity and Interworking: Core Network Aspects," which is incorporated by reference herein. For example, step (5) shows establishment of a user plane connection path between an RNC in the eAN 304 and the HSGW 306. This A10 user plane connection is established by using the A11 signaling plane messages that invoke a specific Service Option (SO). Such a path can be identified by either S059 on a primary A10 or S072 on an auxiliary A10, distinguished by FlowID 0×FF or 0×FE, respectively. These and other conventional features of steps (1) through (20) are well known to those skilled in the art and accordingly will not be described in further detail herein.

As indicated previously, the illustrative embodiments provide an efficient mechanism for the identity of an authenticator (e.g., HSGW 306) to be communicated to a peer (e.g., user equipment 102). This allows key derivation to be based on authenticator identity rather than on a carrier identifier or an authenticator technology identifier, thereby preventing a lying authenticator attack. The illustrative embodiments can be implemented with only minimal changes to the existing 3GPP2 eHRPD standard (e.g., adding a new type to an existing message) or existing IETF standards such as the above-cited RFC 3748.

Alternative embodiments of the invention can utilize different communication system configurations, attack prevention processes, messaging protocols and message formats than those described above in the context of the illustrative embodiments. These and numerous other alternative embodiments within the scope of the appended claims will be readily apparent to those skilled in the art.

What is claimed is:

1. A method comprising:
   establishing, by an access network, a session with user equipment of a communication system; and
   transmitting, in conjunction with establishment of said session, session-specific information from the access network to the user equipment;
   wherein the session-specific information comprises information to be utilized in an authentication protocol carried out between the user equipment and an authentication server of the communication system; and
   wherein the access network is associated with a communication network of a first type and the authentication server is associated with a communication network of a second type different than the first type; and
   wherein the access network uses a StorageBLOB Assignment message to convey the session-specific information to the user equipment, the session-specific information comprising an identifier of a gateway coupled between the access network and the authentication server.

2. The method of claim 1 wherein the access network comprises an HRPD access network, the communication network of the first type comprises an HRPD network, the communication network of the second type comprises an LTE network, and the gateway comprises an HRPD serving gateway configured to provide an interface between the HRPD access network and an evolved packet core of the LTE network.

3. The method of claim 2 wherein the session-specific information transmitted from the access network to the user equipment comprises an identifier of the HRPD serving gateway.

4. The method of claim 3 wherein the identifier of the HRPD serving gateway comprises an Internet protocol address of the HRPD serving gateway.

5. The method of claim 1 wherein the authentication protocol comprises an EAP authentication protocol in which the user equipment operates as an EAP peer, the gateway is operable as an EAP authenticator and the authentication server is operable as an EAP authentication server.

6. The method of claim 1 wherein the StorageBLOB Assignment message has a StorageBLOB type that includes the session-specific information.

7. The method of claim 1 further comprising the access network receiving a StorageBLOBComplete message from the user equipment responsive to the StorageBLOBAssignment message.

8. The method of claim 1 wherein the session-specific information transmitted from the access network to the user equipment comprises an authenticator identifier.

9. The method of claim 8 wherein the user equipment utilizes the authenticator identifier in deriving at least one key.

10. A non-transitory computer-readable storage medium having embodied therein executable program code that when executed by a processor of the access network causes the access network to perform the steps of the method of claim 1.

11. An apparatus comprising:
   an access network configured for communication with user equipment of a communication system;
   the access network being operable to establish a session with the user equipment and to transmit, in conjunction with establishment of said session, session-specific information to the user equipment;

wherein the session-specific information comprises information to be utilized in an authentication protocol carried out between the user equipment and an authentication server of the communication system;

wherein the access network is associated with a communication network of a first type and the authentication server is associated with a communication network of a second type different than the first type; and wherein the access network uses a StorageBLOB Assignment message to convey the session-specific information to the user equipment, the session-specific information comprising an identifier of a gateway coupled between the access network and the authentication server.

12. The apparatus of claim 11 wherein the access network further comprises:
   a base station adapted for communication with the user equipment; and
   a radio network controller coupled to said base station.

13. The apparatus of claim 11 wherein the access network comprises an HRPD access network, the communication network of the first type comprises an HRPD network, the communication network of the second type comprises an LTE network, and the session-specific information comprises an identifier of an HRPD serving gateway configured to provide an interface between the HRPD access network and an evolved packet core of the LTE network.

14. A method comprising:
   establishing, by user equipment, a session with an access network of a communication system; and
   receiving, in conjunction with establishment of said session, session-specific information in the user equipment from the access network;
   wherein the session-specific information comprises information to be utilized in an authentication protocol carried out between the user equipment and an authentication server of the communication system;
   wherein the access network is associated with a communication network of a first type and the authentication server is associated with a communication network of a second type different than the first type;
   wherein the user equipment receives the session-specific information from the access network in a StorageBLOB Assignment message, the session-specific information comprising an identifier of a gateway coupled between the access network and the authentication server.

15. The method of claim 14 wherein the session-specific information received in the user equipment from the access network comprises an authenticator identifier and the method further includes the step of utilizing the authenticator identifier in deriving at least one key.

16. An apparatus comprising:
   user equipment configured for communication with an access network of a communication system;
   the user equipment being operable to establish a session with the access network and to receive, in conjunction with establishment of said session, session-specific information from the access network;
   wherein the session-specific information comprises information associated with an authentication protocol carried out between the user equipment and an authentication server of the communication system;
   wherein the access network is associated with a communication network of a first type and the authentication server is associated with a communication network of a second type different than the first type; and
   wherein the user equipment receives the session-specific information from the access network in a StorageBLOB Assignment message, the session-specific information comprising an identifier of a gateway coupled between the access network and the authentication server.

17. The apparatus of claim 16 wherein the user equipment comprises a mobile telephone, the mobile telephone comprising:
   a processor;
   a memory coupled to said processor; and
   a network interface adapted for communication with the access network.

18. The apparatus of claim 11, wherein the session-specific information comprises an authenticator identifier to be utilized by the user equipment in deriving at least one key.

19. The apparatus of claim 16, wherein the session-specific information comprises an authenticator identifier to be utilized by the user equipment in deriving at least one key.

20. A method comprising:
   establishing, by an access network, a session with user equipment of a communication system; and
   transmitting, via a StorageBLOB Assignment message, session-specific information from the access network to the user equipment in conjunction with establishment of said session, said session-specific information comprising information to be utilized in an authentication protocol carried out between the user equipment and an authentication server of the communication system;
   wherein the session-specific information comprises an identifier of a gateway coupled between the access network and the authentication server.

21. An apparatus comprising:
   an access network configured for communication with user equipment of a communication system;
   the access network being operable:
      to establish a session with the user equipment; and
      to transmit, via a StorageBLOB Assignment message, session-specific information to the user equipment in conjunction with establishment of said session, said session-specific information comprising information to be utilized in an authentication protocol carried out between the user equipment and an authentication server of the communication system;
   wherein the session-specific information comprises an identifier of a gateway coupled between the access network and the authentication server.

* * * * *